(No Model.)   7 Sheets—Sheet 1.

W. B. HAYDEN.
ELEVATING MECHANISM FOR BUILDINGS.

No. 318,373.   Patented May 19, 1885.

Fig. 1.

Witnesses.
Robert Everett
J. A. Rutherford

Inventor.
William B. Hayden
By James L. Norris
Atty (No Model.) 7 Sheets—Sheet 4.

W. B. HAYDEN.
ELEVATING MECHANISM FOR BUILDINGS.

No. 318,373. Patented May 19, 1885.

Witnesses
Robert Everett
J. A. Rutherford

Inventor
William B. Hayden
By James L. Norris
Atty.

(No Model.) 7 Sheets—Sheet 5.
W. B. HAYDEN.
ELEVATING MECHANISM FOR BUILDINGS.

No. 318,373. Patented May 19, 1885.

Witnesses
Robert Everitt
J. A. Rutherford

Inventor
William B. Hayden
By James L. Norris
Atty.

(No Model.)  W. B. HAYDEN.  7 Sheets—Sheet 7.

ELEVATING MECHANISM FOR BUILDINGS.

No. 318,373.  Patented May 19, 1885.

Witnesses.  Inventor.
William B. Hayden.
By James L. Norris.
Atty.

UNITED STATES PATENT OFFICE.

WILLIAM B. HAYDEN, OF COLUMBUS, OHIO.

ELEVATING MECHANISM FOR BUILDINGS.

SPECIFICATION forming part of Letters Patent No. 318,373, dated May 19, 1885.

Application filed April 8, 1885. (No model.)

*To all whom it may concern:*

Be it known that I, WILLIAM B. HAYDEN, a citizen of the United States, residing at Columbus, Franklin county, Ohio, have invented new and useful Improvements in Elevating Mechanism for Buildings, of which the following is a specification.

This invention has for one of its objects to provide novel mechanism for carrying, elevating, and distributing articles throughout the several stories of a building.

The invention has for another of its objects to provide novel mechanism whereby articles can be carried and elevated from one story of a building to and through another story or stories and then be conveyed from the upper story to the lower story.

The invention is especially intended for use in establishments manufacturing sewer-pipe, wherein such articles are formed by a machine in one story and then conveyed and distributed upon the floors throughout the several stories, for the purpose of drying such pipe, after which they are conveyed to the floor of the first story, to be placed in kilns for burning and thereby vitrifying the same. This has heretofore been accomplished almost, if not entirely, by attendants carrying the sewer-pipe from the pipe-forming machine and distributing throughout the several stories of the building, thereby rendering the process of manufacture very laborious, besides necessitating the employment of a large number of workmen, while the rough handling of the sewer-pipe before drying and burning injures them to a great extent.

The above objections are overcome by my invention; to which end it consists, essentially, in a traveling endless chain extending longitudinally through the several stories of a building and vertically through the flooring, combined with devices suspended from the chain for taking articles from one story to and longitudinally through another story or stories, to facilitate the distribution of the articles throughout the building or any portion thereof.

The invention also consists in a traveling endless chain extending longitudinally through the several stories of a building and upwardly through the flooring, combined with platforms having a pivotal connection with the chain, and guides for guiding the platforms vertically through the floor or floors, for taking articles from one story to and longitudinally through another story or stories, to facilitate the distribution of the articles throughout the building or any part thereof.

The invention also consists of a pair of traveling chains extending longitudinally through the several stories and vertically through the flooring of a building, combined with cross-rods connecting the chains, guide-wheels on the rods, horizontal tracks in the several stories, on which the wheels travel, swinging platforms suspended from the cross-bars, and guides for guiding the trays or shelves upward through the floor or floors, for taking articles from one story to and longitudinally through another story or stories, to facilitate the distribution of such articles throughout the building or any part thereof.

The invention also consists in the combination, with a traveling endless chain extending longitudinally through the several stories of a building to and vertically through the floorings, of a table for supporting the articles to be carried and elevated, and a platform suspended from the chain for automatically taking the articles from the table.

The invention also consists in the combination, with a traveling endless chain and platforms suspended therefrom, of a device for automatically removing articles from the platforms as the latter are moved along by the chain.

The invention also consists in the combination, with a traveling endless chain and platforms carried thereby, of a horizontal track for supporting the chain in its horizontal travel, and guides for guiding the platforms in their vertical travel.

The invention also consists of other features, which will be hereinafter described and claimed.

In the accompanying drawings, Fig. 6, a detail side view showing the mechanism for moving the endless chains.

In order to enable those skilled in the art to make and use my invention, I will now describe the same in detail with reference to a four-story building; but I wish it distinctly understood that the construction of the building, its dimensions, and the number of stories are not material, as the invention may be used in any style of building having two or more stories, or a one-story building with a basement or cellar.

The reference-numbers 1 indicate the several floors of the building, having adjacent to the ends the openings or hatchways 2 for the passage of the mechanism, as hereinafter described.

Figure 1:
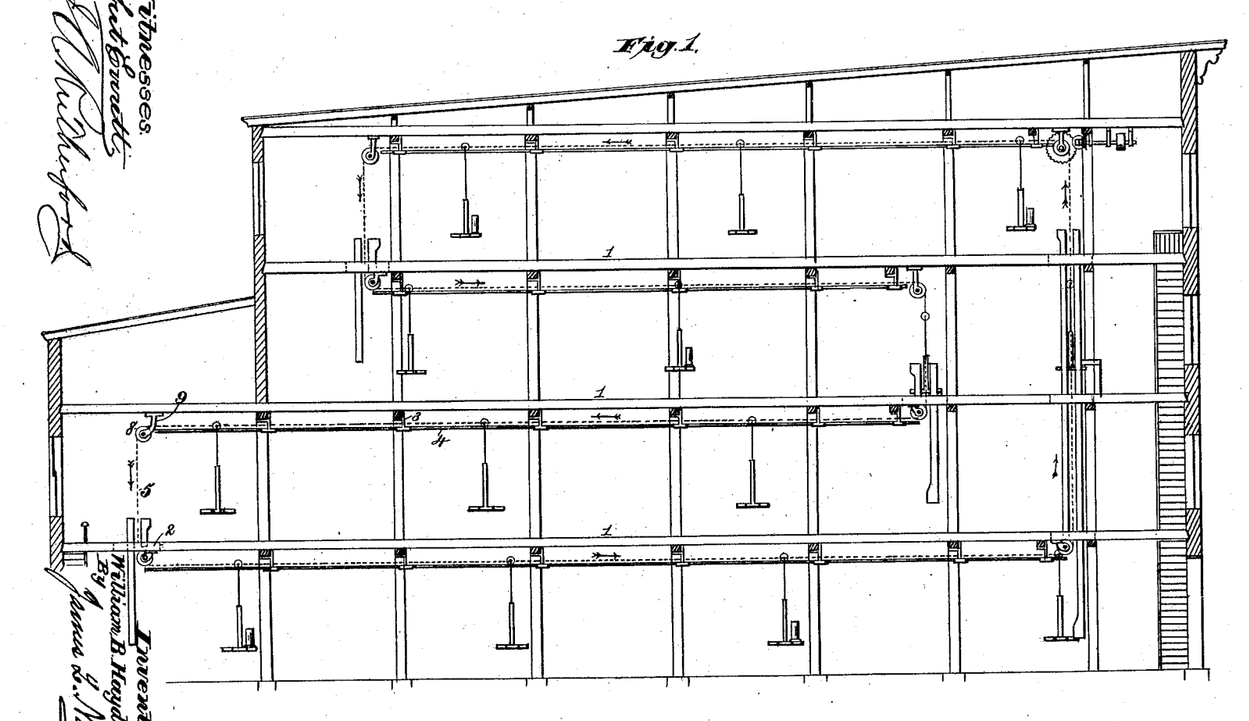
Figure 1 represents a vertical section of a four-story building with my improved carrying and elevating mechanism arranged therein.
Figure 2:
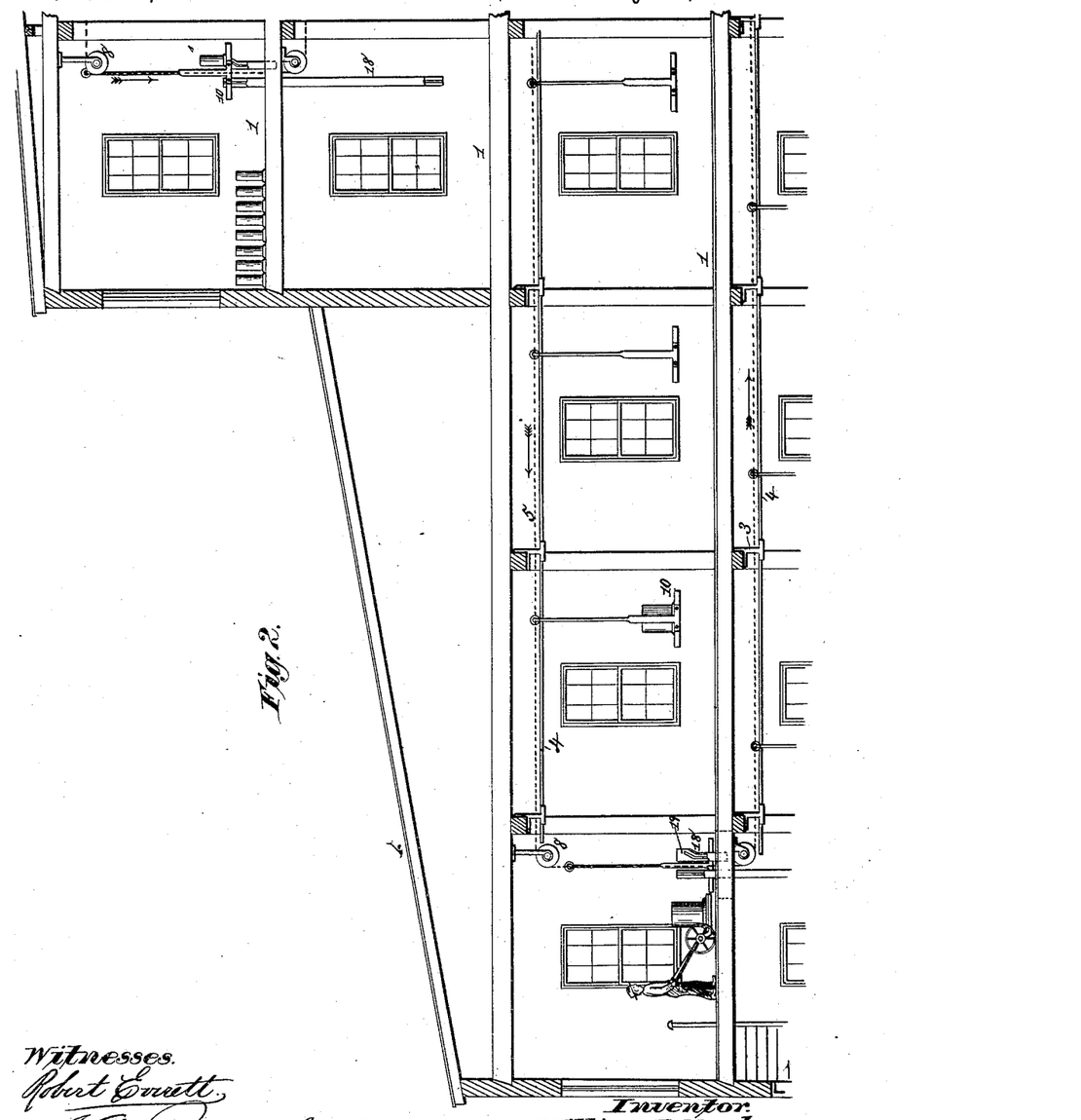
Figs. 2 and 3 taken together show the end portions of Fig. 1 on a larger scale.
Figure 3:
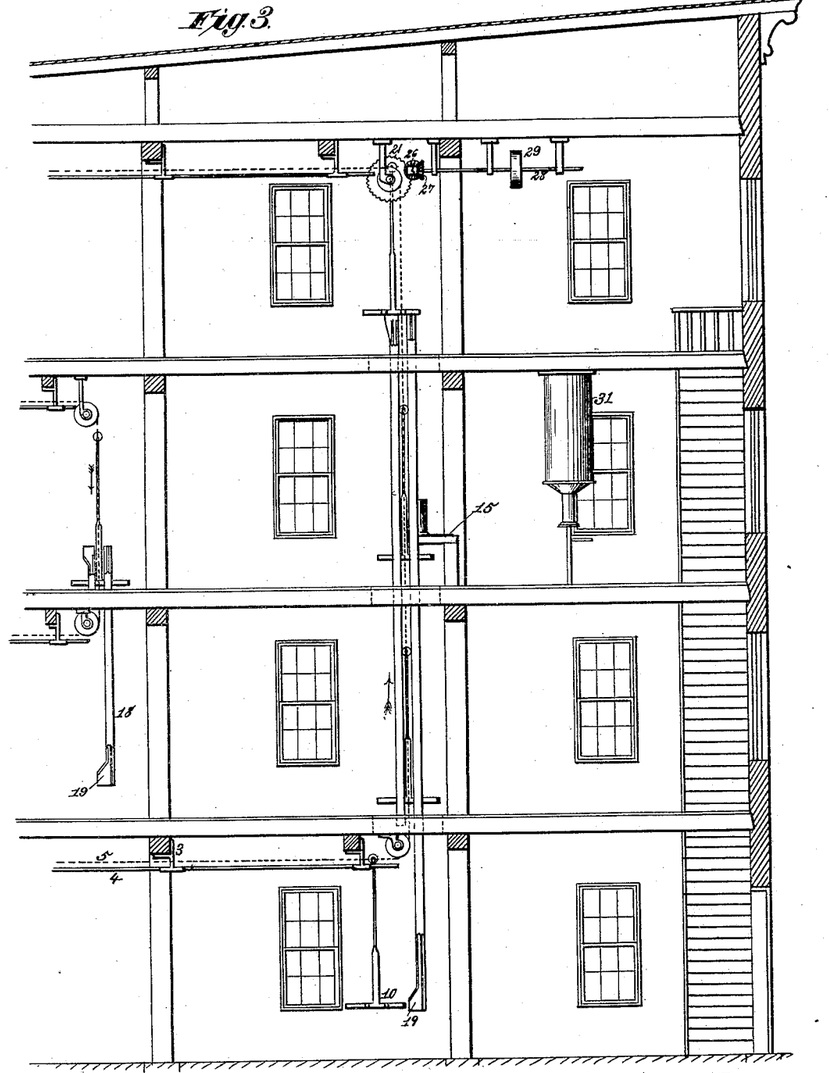
Figure 4:
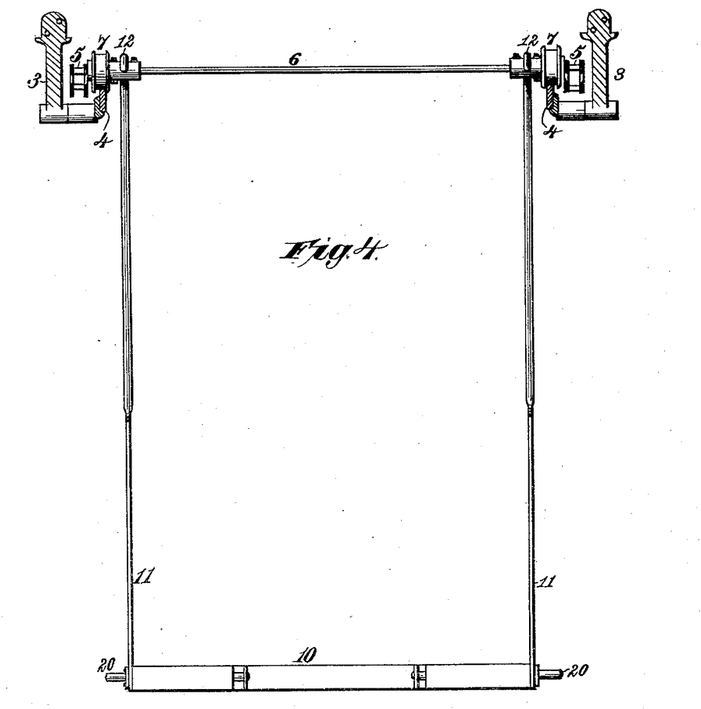
Fig. 4, a detail transverse sectional view taken on the line *x x* of Fig. 1.
Figure 5:
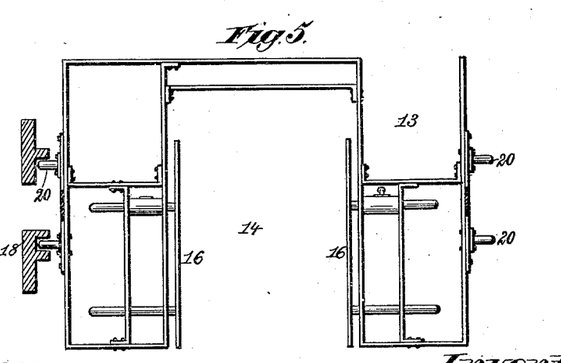
Fig. 5, a horizontal sectional view taken on the line *y y* of Fig. 1.
Figures 6, 10:
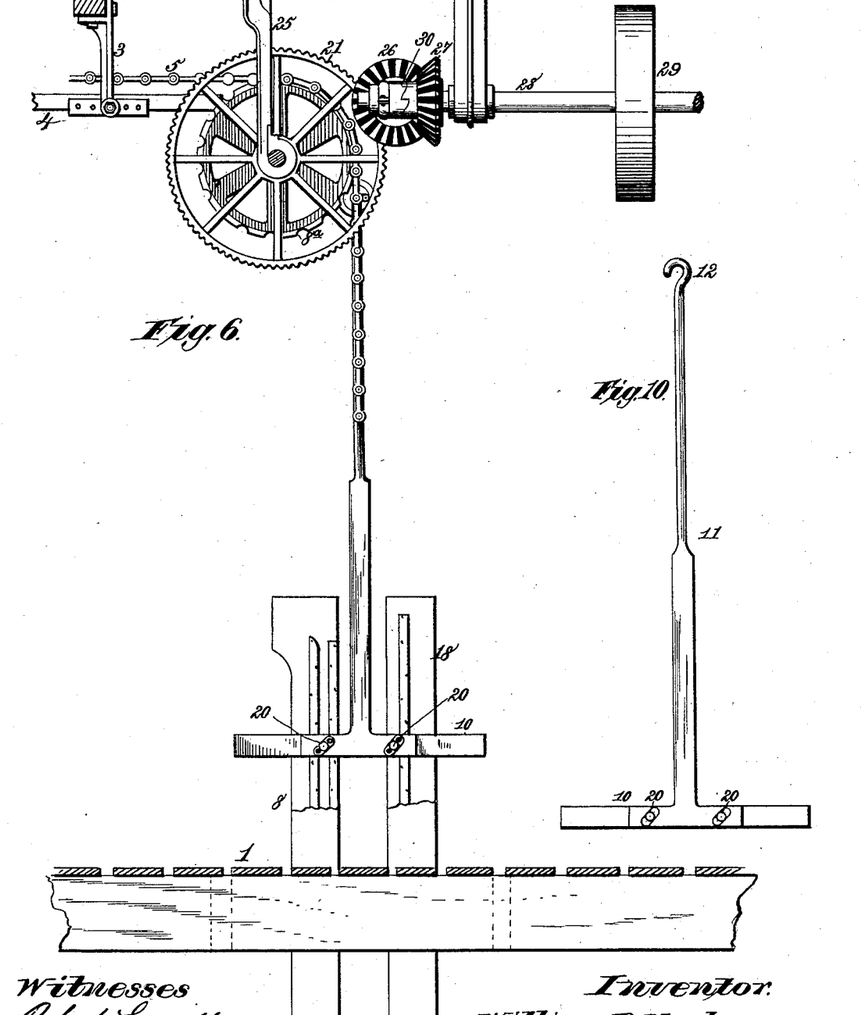
Figure 7:
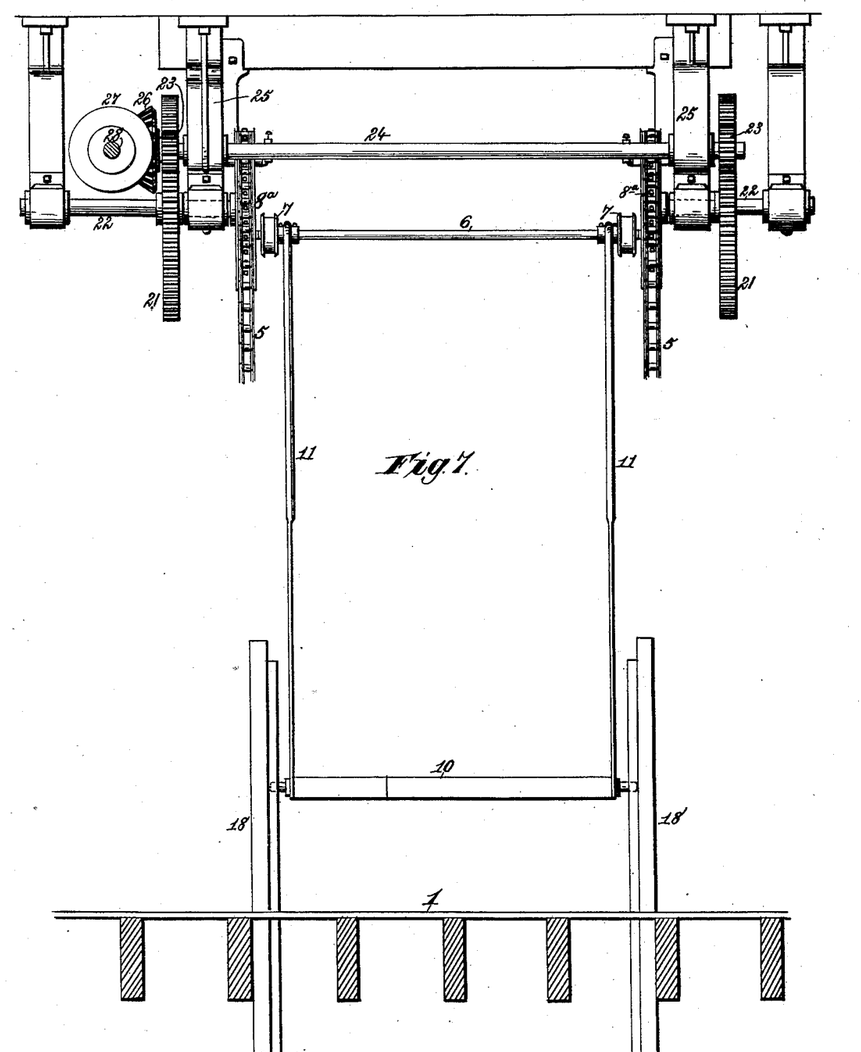
Fig. 7, an end elevation of Fig. 6.
Figure 8:
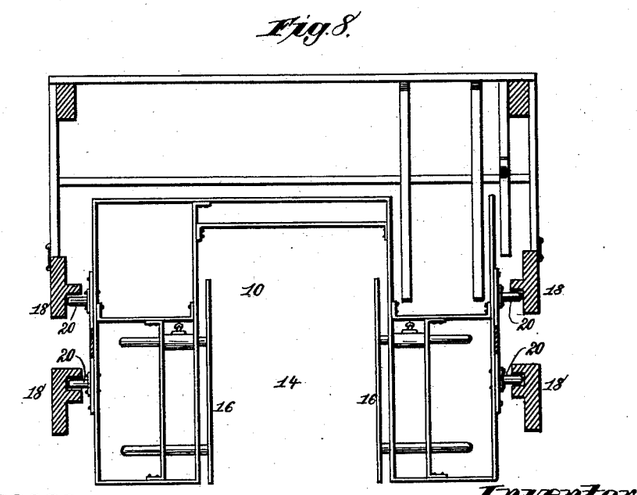
Fig. 8, a plan view of one of the platforms, showing the vertical guideways in section and the table for supporting the article to be carried and elevated.
Figure 9:
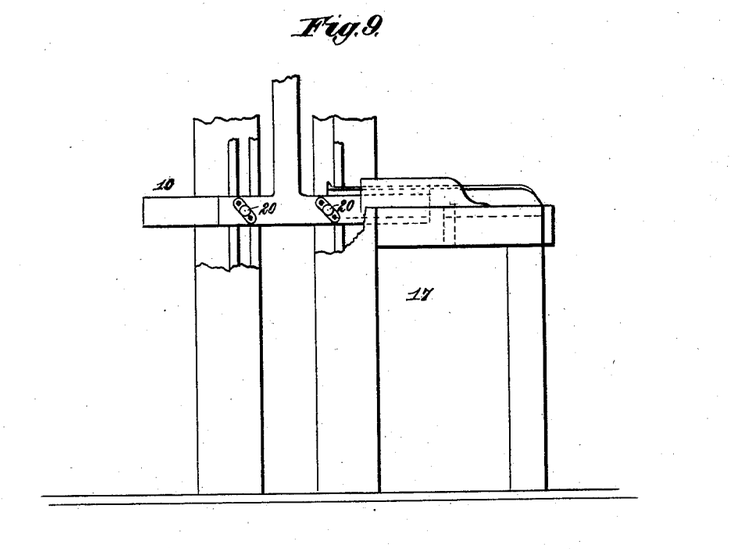
Fig. 9, a side elevation of Fig. 8, and Fig. 10 a detailed side view of one of the swinging platforms.

To beams secured at the ceiling of each story of the building is rigidly fixed a series of hangers, 3, supporting at their lower ends two oppositely-arranged horizontal tracks, 4, the latter being held laterally away from the sides of the hangers, as in Fig. 4, to provide a space for the passage of the endless chains 5. There is a pair of these endless chains arranged parallel to each other—one at each side—and they are connected by rigid cross-bars 6, having adjacent to each end a rotating double-flanged track-wheel, 7, which travel on the track 4, and support those portions of the chains which are moving horizontally. The chains pass around the several chain-wheels 8, which are so disposed and journaled on the hangers 9 that the chains are supported and travel horizontally through the several stories and vertically through the floors, as will be readily understood by reference to Figs. 1, 2, and 3 of the drawings, in such manner that if an article be placed on one of the platforms—say, for example, one moving in the first story—such article will be carried through all the several stories, and if allowed to remain on the platform will be carried back to the first story.

Those portions of the chains moving longitudinally through the building are steadied and sustained through the medium of the horizontal tracks 4 and the track-wheels 7, mounted on the connecting-rods 6, which latter are secured to the chains at such places where it is desired to suspend the platforms 10 for receiving and carrying the articles to be distributed through the building. These platforms are provided at each end with a suspending-rod, 11, having their upper ends journaled or pivoted upon the end portions of the cross-bars 6 adjacent to the track-wheels thereon, and this journaled or pivoted connection upon the end portions of the cross-bars 6 adjacent to the track-wheels thereon and this journaled or pivoted connection of the platforms may be effected in any suitable manner—as, for instance, by simply providing the upper ends of the suspending-rods with hooks 12, by which to hang them from the bars. The rods are of such length that in the horizontal travel of the platforms they will be in such proximity to the flooring that a person standing on the latter can conveniently remove the articles from the platforms and distribute them about such floor at the proper places.

The pivotally-suspended platforms used by me are each composed of a skeleton metallic frame-work constructed with two rectilinear passage-ways or openings, 13 and 14, formed, respectively, in their opposite edges, the one, 14, being considerably larger in area than the other. The smaller opening, 13, is to permit a stationary table, 15, to enter therein as the platform passes thereby, so that the sewer-pipe or other goods placed on such table is picked up by the sides of the platform which bound the opening. This table is of such construction and dimensions that the sewer-pipe or article to be carried and elevated will project laterally therefrom a sufficient distance to permit the edges of the opening in the platform in passing by the table to come against such projecting portions of the article, and thereby pick the same up from the table. The opening 13 is designed for small and the opening 14 for large sewer-pipes or goods. A stationary table—such as 15—may be provided for supporting the large articles to permit them to be automatically picked up by the platform, as above described; or the article may be placed on a truck and wheeled to a suitable position for the convenient removal of the article to the platform; or the article may be automatically picked up from the platform of the truck if the latter be of such dimensions as to enter the large opening 14 of the platform, as in Fig. 2.

The sides of the platform, which constitute the sides of the large opening or passage-way 14, are provided with movable bars 16, having attached guide-rods slidable in the platform-frame in such manner that the bars can be adjusted toward each other for the purpose of contracting the area of the passage-way 14 and affording supports for such goods as would otherwise pass through the passage-way. By this means the platform may have but a single opening or passage-way for the automatic picking up of the goods. I may also employ but one adjustable side bar, 16.

I have illustrated a skeleton platform with two passage-ways or openings therein; but I do not confine myself thereto, as the platform may be of any appropriate construction.

If the articles to be carried, elevated, and distributed through the building are to be automatically picked up by the platforms, it is of course essential to provide a table or equivalent means for supporting the articles.

In carrying and elevating certain classes of merchandise, it may be desirable to automatically discharge or remove the same from the platform at the places desired, and to accomplish this I provide a table, 17, so arranged and held that it enters the passage-way of the platform in the downward movement thereof, thereby sustaining the article while the platform moves onward. This discharging or removing table may be inclined or otherwise so constructed that the article will roll or otherwise move from such table to the floor of the building; but a discharging-table of this character would not be employed where sewer-pipes are carried, for the reason that such goods would scarcely be capable of withstanding such rough usage.

It is essential to provide means whereby the platforms are caused to retain their horizontal position in their vertical travel through the flooring, and this I accomplish by providing at each of the openings or hatchways 2 vertical guideways 18, having converging entrances 19, into which are adapted to pass the laterally-projecting guide studs or rollers 20, secured to the opposite side edges of the platforms in such manner that as the platforms commence to move vertically the studs or rollers will be guided into the guideways by the converging entrances thereto, and thus the horizontal position of the platforms is preserved. To permit this it is necessary to have the platforms pivotally connected with the supporting cross-bars, as before explained, and which will be readily understood.

The vertical guideways may be provided in any suitable manner, but are preferably formed by parallel cleats or slats secured to beams at such distance apart as to create grooves to receive the guide studs or rollers on the platforms.

The travel of the chains may be effected by any appropriate mechanism; but I have provided simple and practical driving devices, which consist of gear-wheels 21 on the shafts 22 of one pair of the chain-wheels 8 at the upper portion of the building, such gear-wheels engaging pinions 23, secured to the ends of a shaft, 24, supported by hangers 25. To one end of this shaft is fixed a bevel gear-wheel, 26, engaging a bevel gear-wheel, 27, on the driving-shaft 28, the latter having a pulley, 29, which in practice is belted to an engine or other motor, thereby transmitting rotary motion to the aforesaid chain-wheels, which cause the chains to travel. A clutch, 30, is provided on the driving-shaft, by which the bevel-wheel 27 may be made fast or loose on the driving-shaft for starting or stopping the chains.

The invention is adapted for carrying and elevating merchandise in general, but is especially intended for carrying and elevating sewer-pipes in establishments manufacturing such class of goods. The sewer-pipes will be taken direct from the pipe-forming machine 31, (shown in Fig. 3,) which may be a steam-press of any ordinary or suitable construction, and are placed on the table 15, from which they are picked up by the platforms and carried to and through the building. A person is stationed at the place where the pipes are to be removed, and thus the pipes can be distributed throughout the building or any part thereof with great facility and speed. The pipes are placed upon the flooring to dry, after this has been effected they are placed on the platforms to be conveyed to the first floor, to be burned in a kiln, as usual. If goods other than sewer-pipes are to be carried and elevated, they can be both automatically picked up by the platforms and discharged or removed therefrom, as hereinbefore described. Where pipes of varying diameter are to be distributed through the building, the different openings in each platform are useful; but it can be accomplished through the medium of the movable sides of the opening, as before explained.

I have shown the chain-supports for the platforms as moving longitudinally through the building in horizontal planes; but I do not confine myself thereto, inasmuch as the chains may travel in a slightly-inclined plane, it only being essential to incline the tracks on which the track-wheels travel.

I have shown and described the traveling supports as composed of chain-links; but, obviously, wire or similar cables can be employed for this purpose.

I would say, in conclusion, that after the sewer-pipes have been dried in the building and returned to the first story, to be burned in kilns, it may be desirable to convey the pipes to the kilns through the medium of mechanical means. This can be accomplished by passing a carrier such as I have described through the sides of the building to the outside thereof for delivering the goods direct to the kilns or to cars for shipment.

Having thus described my invention, what I claim is—

1. The combination of a chain extending longitudinally through the stories of a building and vertically through the flooring with devices loosely suspended from the chain for taking articles from one story to and longitudinally through another story or stories, substantially as described.

2. The combination of a chain extending longitudinally through the stories of a building and vertically through the flooring with tracks for steadying and supporting the chain in its longitudinal movement through the stories, and devices suspended from the chain for taking articles from one story to and longitudinally through another story, substantially as described.

3. The combination of a pair of connected and parallel chains extending longitudinally through the stories of a building and vertically through the flooring with devices loosely suspended from the chains for taking articles from one story to and longitudinally through another story, substantially as described.

4. The combination of a pair of parallel chains extending longitudinally through the stories of a building and vertically through the flooring with cross-bars connecting the chains, guide-wheels, horizontal tracks on which the wheels travel, and loosely-suspended platforms for taking articles from one story to and longitudinally through another story, substantially as described.

5. The combination of a pair of parallel chains extending longitudinally through the stories of a building and vertically through the flooring with cross-bars connecting the chains, guide-wheels upon the cross-bars, horizontal tracks on which the wheels travel, and platforms loosely suspended from the cross-bars for taking articles from one story to and longitudinally through another story, substantially as described.

6. The combination of a chain extending longitudinally through the stories of a building and vertically through the flooring with guides arranged through the flooring, and platforms having a pivotal connection with the chain and adapted to engage the guides when moving vertically for taking articles from one story to and longitudinally through another story, substantially as described.

7. The combination of a pair of parallel chains extending longitudinally through the stories of a building and vertically through the flooring with horizontal tracks, cross-bars connecting the chains, guide-wheels moving on the tracks, loosely-suspended platforms, and vertically-arranged guides through the flooring, with which the platforms engage in their vertical movement, substantially as described.

8. The combination of the endless chains, the loosely-suspended platforms, and the vertical guides with which the platforms engage in their vertical movement, substantially as described.

9. The combination of the endless chains, the loosely-suspended platforms having studs or rollers at their edges, and the vertical guide-grooves with which the studs or rollers engage in their vertical movement through the flooring, substantially as described.

10. The combination of the endless chains, the loosely-suspended platforms having studs or rollers at their edges, and the vertical guides having converging entrances, substantially as described.

11. The combination, with a traveling chain, of a table for supporting the articles to be carried, and loosely-suspended platforms for automatically picking up the articles from the table, substantially as described.

12. The combination, with a traveling chain, of a table for supporting the articles to be carried, and a loosely-suspended platform having a passage-way or opening to receive the table for automatically picking up the articles therefrom, substantially as described.

13. The combination, with a traveling chain, of a loosely-suspended platform having a passage-way or opening to permit the articles to be introduced upon the platform, substantially as described.

14. The combination, with a traveling chain, of the loosely-suspended platform having a passage-way or opening and an adjustable side or sides for carrying different sizes of articles, substantially as described.

15. The combination of traveling endless chains extending longitudinally through the stories of a building and vertically through the flooring with pivotally-suspended platforms, and a table by which the platforms pass for picking up articles therefrom, substantially as described.

16. The combination of endless traveling chains extending longitudinally through the stories of a building and vertically through the flooring with horizontal tracks for supporting the chains, loosely-suspended platforms, and a table from which the platforms automatically pick up the articles to be carried and distributed, substantially as described.

17. The combination of a traveling endless chain, loosely-suspended platforms, a table for supporting the article to be carried by the platform, and a device for automatically discharging or removing the article from the platform, substantially as described.

18. The combination of an endless chain extending longitudinally through the stories of a building and vertically through the flooring, a track for steadying and supporting the chain in its longitudinal movements, loosely-suspended platforms, guides for the vertical movement of the latter, and a table from which the articles to be carried are automatically picked up by the platforms, substantially as described.

19. The combination of chain-wheels in the respective stories, wheel-shafts, chains, and carrying-platforms with gear-wheels on one pair of the chain-wheel shafts, a shaft having pinions engaging the gear-wheels, bevel-wheels, and a driving-shaft, substantially as described.

20. The combination, with a building, of pivotally-suspended platforms, traveling supports therefor extending horizontally through the stories of the building and vertically through the flooring, and guides for preserving the horizontal position of the platforms in their vertical movement, whereby articles placed on the platforms may be moved from one story to and horizontally through another story, substantially as described.

21. The combination, with a building, of pivotally-suspended platforms, traveling supports therefor extending horizontally through the stories of the building and vertically through the flooring, guides for preserving the horizontal position of the platforms in the vertical movement through the flooring, and a table from which the articles to be carried are automatically picked up, substantially as described.

In testimony whereof I affix my signature in presence of two witnesses.

WILLIAM B. HAYDEN.

Witnesses:
  HENRY T. FAY,
  E. K. STEWART.